United States Patent [19]

Davidson

[11] 3,884,517

[45] May 20, 1975

[54] SAFETY BUMPER FOR TRUCKS

[76] Inventor: Spydell Davidson, P.O. Box 145, Highway 45, Martin, Tenn. 38237

[22] Filed: July 25, 1973

[21] Appl. No.: 382,357

[52] U.S. Cl. .................................. 293/76; 293/99
[51] Int. Cl. ............................................ B60r 19/04
[58] Field of Search ............ 293/70, 75, 76, 77, 78, 293/79, 85, 98, 99, DIG. 3; 280/11.35 N

[56] References Cited
UNITED STATES PATENTS

| | | | |
|---|---|---|---|
| 2,896,735 | 7/1959 | Bohn | 293/DIG. 3 |
| 3,081,119 | 3/1963 | Dison | 293/DIG. 3 |
| 3,398,969 | 8/1968 | Perry | 280/11.35 N |
| 3,596,963 | 8/1971 | Phillips | 293/76 |

Primary Examiner—Richard A. Schacher
Assistant Examiner—Robert Saifer
Attorney, Agent, or Firm—B. P. Fishburne, Jr.

[57] ABSTRACT

A bumper for trucks or similar vehicles includes a central main section rigid with the truck main frame. End or wing bumper sections are coupled to the opposite ends of the main section through shear pins which will shear cleanly in response to a specified impact against the wing sections. The wing sections will withstand normal impact before failure of the shear pins. Following failure of the shear pins the wing sections are thrown clear of the main bumper section and the front wheels of the truck by spring means. Tethering cables prevent the wing sections from falling loosely on the roadway. The invention prevents loss of steering control caused by bending of the conventional bumper end portion around the adjacent front wheel.

4 Claims, 9 Drawing Figures

PATENTED MAY 20 1975

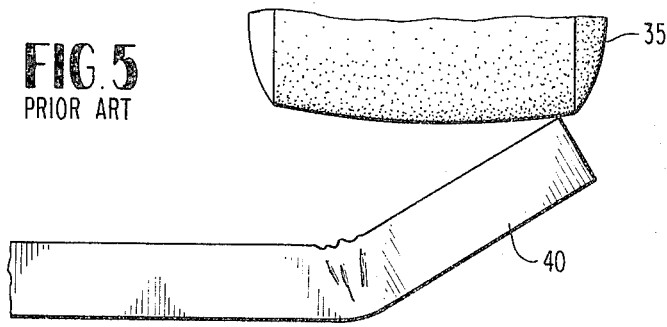
FIG.5 PRIOR ART
FIG.6
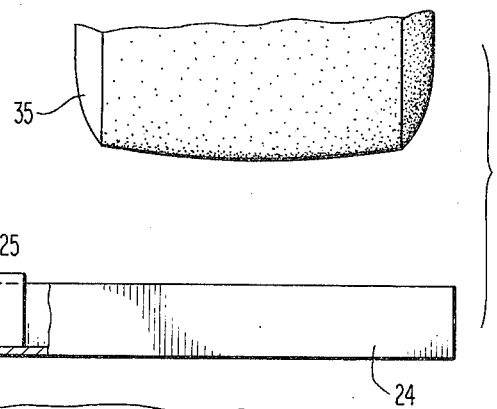
FIG.7
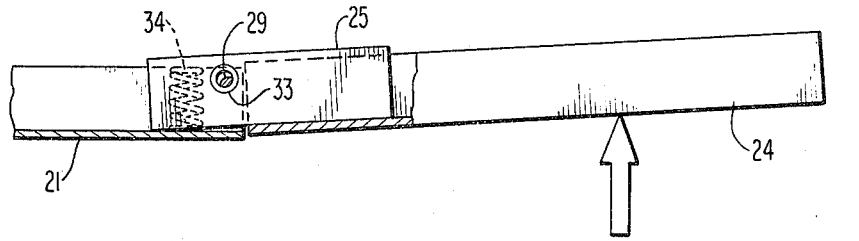
FIG.9
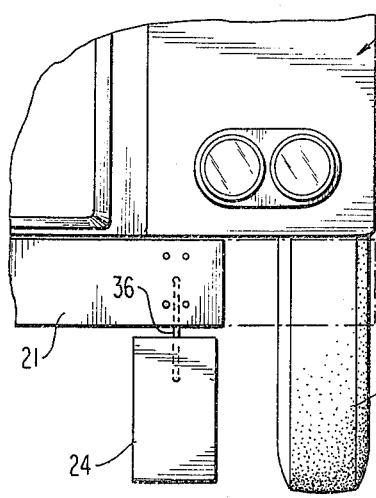
FIG.8
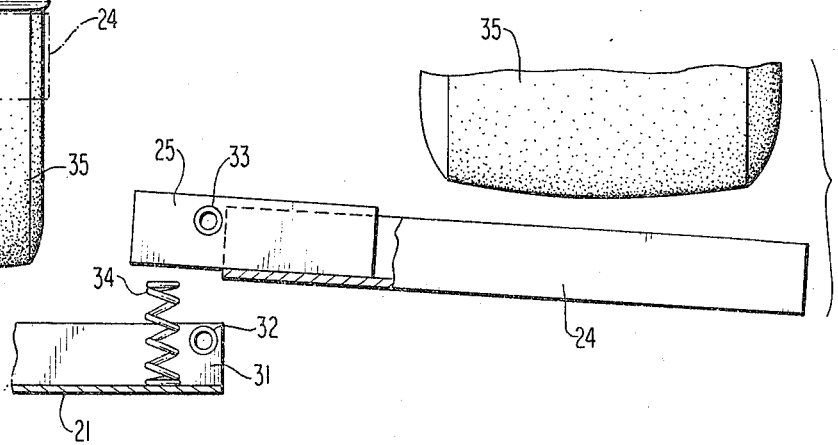

SAFETY BUMPER FOR TRUCKS

BACKGROUND OF THE INVENTION

With increasing emphasis on highway safety, at least one serious hazard has been neglected. Large trucks including semi-trailers and similar vehicles are customarily equipped with heavy front bumpers which are capable of withstanding impact loads of up to 7,000 pounds before bending or yielding at their end portions directly in front of the front wheels of the truck through which steering of the truck is accomplished. Consequently whenever the end portions of these heavy truck bumpers are struck with excessive force, they tend to bend rearwardly directly into contact with the adjacent front steering wheel and frequently rob the driver instantly of steering control, in whole or in part. This is obviously a highly dangerous situation for a large truck traveling at turnpike speeds, and the occurrance has resulted in disastrous accidents in many cases.

In light of the above, the objective of this invention is to deal with the above particular problem effectively by the provision of a safety bumper which upon impact will prevent the described rearward bending of the end portions toward the front steering wheels and thus eliminate the hazard of loss steering control. In accordance with the invention, the bumper end portions or wings are still fully capable of withstanding the standard impact, about 7,000 pounds, before failure. Additionally, when impact above this degree occurs, the particular bumper end portion is not bent toward or around the adjacent front wheel, but instead is cleanly separated from the main body portion of the bumper and falls harmlessly to a tethered hanging position below the bumper body portion, affording the driver complete unimpeded steering control at all times.

More particularly, in accordance with the invention, the bumper end portions or wings are connected to the central body portion of the bumper by pins which will shear cleanly under severe impact against the end portions or wings. Additionally, spring means are employed in conjunction with the shear pins to assure that the wings are fully separated from the bumper body portions following severe impact and shear pin failure. This spring means also tends to move the separated bumper wings away from the front steering wheels rather than into the same. Each wing is connected to the fixed central bumper body portion by a tethering cable which prevents a separated wing from falling loosely and dangerously onto the roadway following an accident. Instead, the separated bumper wing will continue to hang harmlessly beneath the central bumper body portion while the truck is being brought to a stop with full steering control.

Other features and advantages of the invention will become apparent during the course of the following description.

BRIEF DESCRIPTION OF DRAWING FIGURES

FIG. 5 is a fragmentary partly diagrammatic plan view illustrating the prior art and the hazardous steering condition which can result in the prior art;

FIGS. 6 through 9 are a series of partly diagrammatic views depicting the operation of the invention following an impact force on one wing of the safety bumper sufficient to sever the shear pin means.

DETAILED DESCRIPTION OF THE PREFERRED EMBODIMENT

Figure 1:
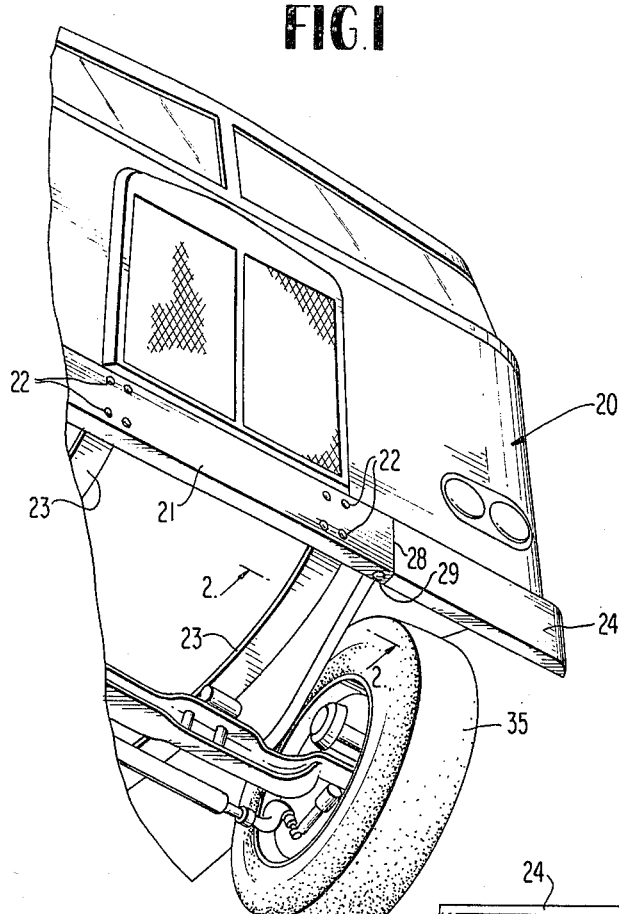
FIG. 1 is a fragmentary perspective view of a truck equipped with a safety bumper embodying the invention.

Referring to the drawings in detail, wherein like numerals designate like parts throughout, the numeral 20 designates a typical truck tractor of the type employed in semitrailer or full trailer caravans. While the present invention is disclosed in connection with a truck of this character, it should be fully understood that the invention is applicable to any vehicle having a front bumper of the type in question with end portions capable of being forced rearwardly on impact against or close to the front steering wheels so as to prevent proper steering.

With continued reference to the drawings, the truck 20 has a front bumper including a main central portion 21 of channel formation in cross section which is bolted directly at 22 to the main frame members 23 of the truck chasses. As shown in FIG. 1, the recessed side of the bumper faces rearwardly so that a smooth flat vertical impact face of the bumper is arranged forwardly. The main central portion 21 of the bumper is very rigid and immovable and does not bend readily except under the most severe impact conditions.

The bumper embodying the invention includes an end section or wing 24 at each end of the main central portion 21 and being of like cross sectional size and shape with the main section. Each wing 24 has fixedly secured within it a bridging channel section or bracket 25. This bracket faces oppositely to the sections of the bumper in terms of its recessed side, FIG. 4, and the top and bottom flanges 26 and 27 of each bracket 25 lie below and above the corresponding flanges of the adjacent bumper sections 21 and 24. The bracket 25 spans the separation line 28 between the adjacent sections 21 and 24 and fits snugly inside of the channel shaped bumper sections. Preferably each bracket 25 is welded or otherwise rigidly secured permanently to the particular wing section 24 of the safety bumper.

Figure 4:
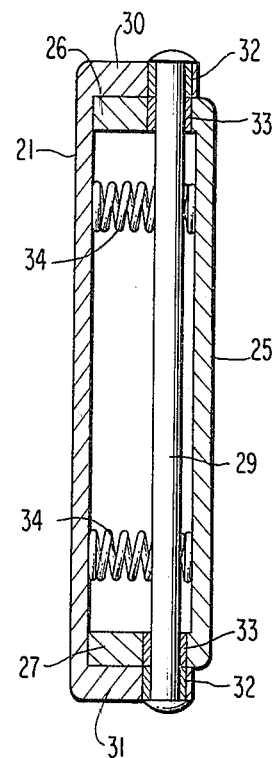
FIG. 4 is a transverse vertical section taken on line 4—4 of FIG. 2.

Each wing section 24 is connected to the central bumper section 21 by a single vertical shear pin 29 whose opposite end portions engage through aligned openings in the flanges 26 and 27 of the bracket 25 and in the adjacent flanges 30 and 31 of bumper section 21. As shown in FIG. 4, each shear pin is preferably mounted in bushings 32 and 33 where it passes through the pairs of flanges 26–30 and 27–31. The materials employed to make the parts and their sizes are chosen to cause each pin 29 to be cleanly sheared at the top and bottom faces of the bracket 25 whenever the bumper wing 24 receives a blow in excess of approximately 7,000 pounds, which it is designed to withstand before collapsing and separating from the main body portion 21.

In order to insure clean and complete separation of the wing 24 from the body portion 21 on shearing of the pin 29, a pair of vertically aligned stiff compression springs 34 is interposed between the vertical webs of the bracket 25 and bumper body portion 21 as clearly shown in FIG. 4. These springs are immobilized prior to shearing of the pin 29 at the two locations adjacent the top and bottom of bracket 25. However, once the pin is sheared the force of the two springs 34 would push the bracket 25 and the shear section of the pin 29 inwardly or rearwardly to affect the complete separation of the wing 24 from the body portion 21 as depicted diagrammatically in FIG. 8. Since the bracket 25 is permanently attached to the wing 24, the entire assembly is thrown clear of the body portion 21 by the force of the springs. While the inner end of the wing 24 carrying the bracket 25 is forced toward the adjacent front wheel 35 of the truck, its outer end will tend to be swung or pivoted away from the wheel 35 and ordinarily will not strike the wheel. However, no damage will be done even if the detached wing should strike the front wheel 35 as it will merely bounce away from the same.

Figure 3:
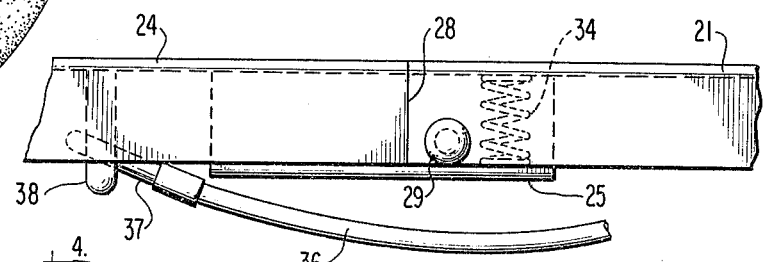
FIG. 3 is a fragmentary plan view of the bumper as depicted in FIG. 2.
Figure 2:
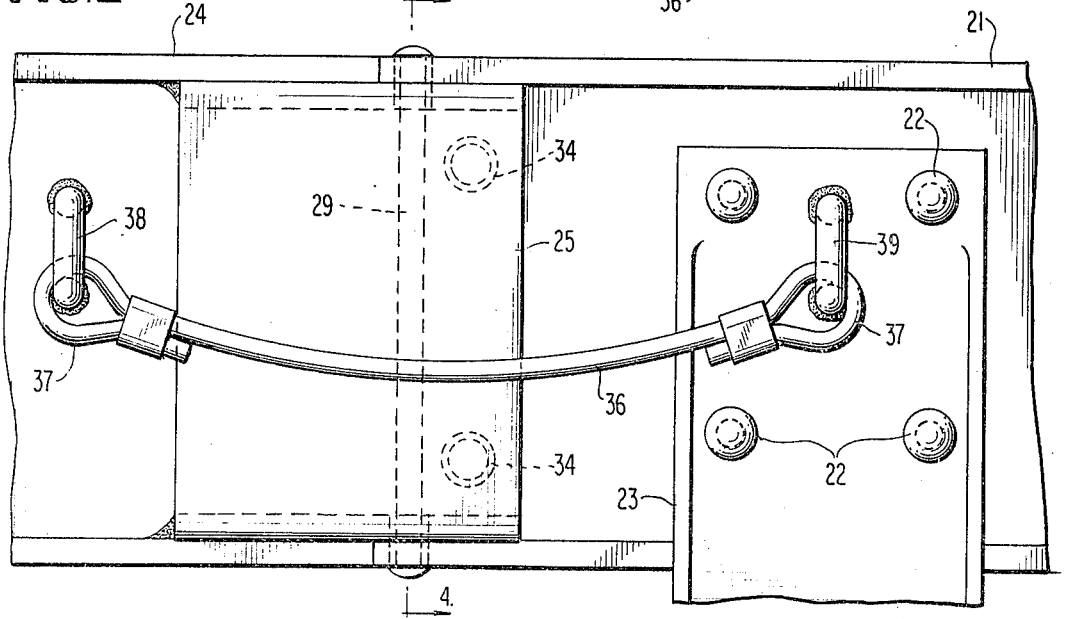
FIG. 2 is an enlarged fragmentary interior side elevation of the bumper taken on line 2—2 of FIG. 1.

To prevent the detached wing and associated elements from tumbling loosely on the roadway which would present a rather serious traffic hazard, the wing assembly is attached to the fixed bumper body portion 21 by a short tethering cable 36, FIGS. 2 and 3, whose opposite end loops 37 are connected to eyes 38 and 39 on the rearward sides of the wing 24 and frame member 23 respectively. The length of the cable 36 is chosen so that the wing 24 when hanging freely from the cable as shown in FIG. 9, will not drag on the roadway and will simply be held safely in depending relationship to one end of the body portion 21.

FIG. 5 depicts a typical situation resulting from a severe impact against one end portion 40 of a prior art type bumper. The end portion 40 which is well outwardly of the chassis frame, bends rearwardly toward and sometimes against the adjacent front wheel 35 and often cripples the steering of the truck so that a crash will occur. As stated, the invention alleviates this problem completely.

FIG. 6 shows the invention including one end wing 24 in the normal position relative to the front wheel 35 before impact in excess of the degree which the bumper is designed to withstand, normally about 7,000 pounds. FIG. 7 shows the wing 24 yielding under a severe impact force and the pin 29 is being sheared. The body portion 21 under support of the truck main frame remains stationary.

FIG. 8 shows the wing 24 after impact and after the complete shearing of the pin 29 and separation of the wing from body portion 21, due to the described action of the springs 34. Finally, FIG. 9 shows the tethered separated wing hanging freely from the bumper body portion 21 by means of the cable 36. In such a condition there is no obstruction to the wheel 35 caused by the bumper and full steering control is retained by the truck driver.

In view of the foregoing description the various advantages of the invention over the prior art should now be clear to those skilled in the art, and further explanation of the invention is believed not to be necessary.

It is to be understood that the form of the invention herewith shown and described is to be taken as a preferred example of the same, and various changes in the shape, size and arrangement of parts may be resorted to, without departing from the spirit of the invention or scope of the sub-joined claims.

I claim:

1. In a vehicle having front steering wheels and a front bumper in advance of the front steering wheels including bumper end portions which extend across the wheel treads in spaced relation thereto, the improvement comprising means forming a connection between the bumper end portions and a central body portion of the bumper, said means constructed and arranged to fail mechanically when an end portion of the bumper receives an impact force in excess of a predetermined degree which the bumper end portion can withstand without causing failure of said means, the failure of said means producing separation of the bumper end portion bodily from said central body portion, said means including a shear pin connecting each bumper end portion to the central body portion, and resilient means connected with each bumper end portion whose energy is released on failure of the shear pin to force clean separation of the bumper end portion from said body portion.

2. The structure of claim 1 and a flexible tethering element interconnecting each bumper end portion with said central body portion and being of a length to support the separated bumper end portion in free hanging relationship to the central body portion without said end portion contacting the roadway.

3. The structure of claim 1 and said resilient means comprising expansible coil springs arranged between opposing portions of the central body portion and said bumper end portions and being held under compression prior to failure of said shear pins.

4. The structure of claim 1 and a bracket element secured fixedly to each bumper end portion and interfitting with an adjacent end of the central body portion and bridging the line of separation between such end and the adjacent bumper end portion, said shear pin mounted in aligned opening means of the bracket element and central body portion.

* * * * *